(12) United States Patent
Cudak et al.

(10) Patent No.: US 9,280,293 B2
(45) Date of Patent: Mar. 8, 2016

(54) RAID 1 MIRROR MESHED INTO A CO-EXISTING RAID 5 PARITY STREAM

(71) Applicant: International Business Machines Corporation, Armonk, NY (US)

(72) Inventors: Gary D. Cudak, Creedmoor, NC (US); Lydia M. Do, Raleigh, NC (US); Christopher J. Hardee, Raleigh, NC (US); Adam Roberts, Moncure, NC (US)

(73) Assignee: Lenovo Enterprise Solutions (Singapore) Pte. Ltd., Singapore (SG)

( * ) Notice: Subject to any disclaimer, the term of this patent is extended or adjusted under 35 U.S.C. 154(b) by 116 days.

(21) Appl. No.: 14/285,673

(22) Filed: May 23, 2014

(65) Prior Publication Data

US 2015/0339067 A1 Nov. 26, 2015

(51) Int. Cl.
*G06F 11/00* (2006.01)
*G06F 3/06* (2006.01)
*G06F 11/10* (2006.01)

(52) U.S. Cl.
CPC ............ *G06F 3/0619* (2013.01); *G06F 3/0647* (2013.01); *G06F 3/0689* (2013.01); *G06F 11/1096* (2013.01)

(58) Field of Classification Search
CPC ............ G06F 11/1458; G06F 11/2046; G06F 11/0787; G06F 11/1044; G06F 3/0619; G06F 3/0665; G06F 3/0689
See application file for complete search history.

(56) References Cited

U.S. PATENT DOCUMENTS

| 8,412,904 B2* | 4/2013 | Flynn ...................... G06F 1/183 711/168 |
| 2010/0138691 A1* | 6/2010 | Kumar ................ G06F 11/1076 714/6.23 |

(Continued)

FOREIGN PATENT DOCUMENTS

WO WO2006079085 A2 7/2006

OTHER PUBLICATIONS

Carlane, C. et al.; "IBM System Storage N series Implementation of RAID Double Parity for Data Protection"; IBM Corporation; http://www.ibm.com/redbooks/redp-4169-00 . . . ; 2006, 22 pages. (This document only identifies the year of publication (without the month), but the year of publication is sufficiently earlier than the effective U.S. filing date and any foreign priority date so that the particular month of publication is not in issue. See MPEP 609.04(a)).

(Continued)

*Primary Examiner* — Nadeem Iqbal
(74) *Attorney, Agent, or Firm* — Katherine S. Brown; Jeffrey L. Streets

(57) ABSTRACT

A computer program product includes a computer readable storage medium having program instructions embodied therewith, wherein the program instructions are executable by a processor to cause the processor to perform a method. The method includes storing an operating system in minor stripes on a first data storage device forming a first logical storage unit, and storing data in major stripes across a plurality of data storage devices forming a second logical data storage unit. Each major stripe includes a plurality of minor stripes storing data and a parity stripe. The method further includes calculating the parity stripe from the plurality of minor stripes within the major stripe and a corresponding one of the minor stripes on the first data storage device, wherein the minor stripes on the first data storage device match the size of the minor stripes on the array of data storage devices.

13 Claims, 3 Drawing Sheets

(56) References Cited

U.S. PATENT DOCUMENTS

2015/0012701 A1* 1/2015 Cudak .................. G06F 3/0619 711/114
2015/0012775 A1* 1/2015 Cudak .................. G06F 3/0619 714/6.22

OTHER PUBLICATIONS

IBM; "Internal Model for Dynamically-Virtualizing the Storage of Data Between a RAID-6 and a Mirror"; An IP.com Prior Art Database Technical Disclosure; http://ip.com/IPCOM/000160533D; Nov. 19, 2007, 5 pages.

Tom's Hardware "Mixing RAID types in different partitions", Mixing RAID types in different partitions—Hard Drives—Storage, http://www.tomshardware.com/forum/203424-32-mixing-raid-types-parti . . . , Oct. 9, 2006, 6 pages.

Wikipedia, "Nested RAID levels", Nested RAID levels—Wikipedia, the free encyclopedia, http://en.wikipedia.org/wiki/Nested_RAID_levels, Dec. 31, 2013, 5 pages.

* cited by examiner

RAID 1 MIRROR MESHED INTO A CO-EXISTING RAID 5 PARITY STREAM

BACKGROUND

1. Field of the Invention

The present invention relates to the management of data storage, specifically including the use of a redundant array of independent disks.

2. Background of the Related Art

In modern computer systems, the need for data reliability and input/output performance has led to the development of a series of data storage schemes that divide and replicate data among multiple data storage devices. Such a storage scheme is commonly referred to as a Redundant Array of Independent Disks (RAID). A RAID system combines physical data storage devices, such as hard disk drives, into a single logical unit by using either special hardware or software. A hardware solution will typically be designed to present itself to the attached system as a single logical device or drive, such that the operating system is unaware of the technical workings of the underlying array. Alternatively, a software solution may be implemented in an operating system, and would similarly present the RAID drive to applications as a single device or drive. The minimum number of drives and the level of data reliability depend on the type of RAID scheme that is implemented.

Originally there were five RAID levels, where different RAID levels use one or more techniques referred to as mirroring, striping and error correction. Mirroring involves the copying of data to more than one disk, striping involves the spreading of data across more than one disk, and error correction involves storing redundant data (parity) to allow problems to be detected and possibly fixed.

A RAID 0 array spreads data evenly across two or more disks with no parity. Accordingly, it can be said that RAID 0 provides striping without any redundancy. RAID 0 is appropriate for high performance where there is little or no concern over data integrity.

A RAID 1 array provides a complete and exact copy of data on two or more disks. Accordingly, RAID 1 includes complete redundancy or mirroring. The performance of RAID 1 is good, and may optionally include duplexing that enables independent reading of different sectors of the disks to increase speed further. The data integrity of RAID 1 is also good, due to the complete copy maintained in the companion disk.

In general, RAID 3 provides byte-level striping with a dedicated parity disk, RAID 4 provides block-level striping with a dedicated parity disk, and RAID 5 provides block-level striping with parity data distributed across all member disks. RAID 5 has achieved popularity due to its low cost of redundancy. Generally, RAID 5 is implemented with hardware support for parity calculations. A minimum of three disks is generally required for a complete RAID 5 configuration. RAID 5 offers a balance between price and performance for most commercial server workloads, and provides single-drive fault tolerance by implementing a technique called single equation single unknown. The checksum information is evenly distributed over all drives, and checksum update operations are evenly balanced within the array.

During read operations, parity blocks are typically not read since this would be unnecessary overhead and would diminish performance. The parity blocks are read, however, when a read of a data sector results in a CRC error (each sector is protected by a CRC as well). In this case, the sector in the same relative position within each of the remaining data blocks in the stripe and within the parity block in the stripe are used to reconstruct the errant sector. The CRC error is thus hidden from the main computer. Likewise, should a disk fail in the array, the parity blocks from the surviving disks are combined mathematically with the data blocks from the surviving disks to reconstruct the data on the failed drive "on the fly". However, in RAID 5, where there is a single parity block per stripe, the failure of a second drive results in total data loss. The foregoing discussion of RAID levels is intended to provide general examples of features included in different RAID levels, and is not intended be a comprehensive list or description of RAID levels.

BRIEF SUMMARY

One embodiment of the present invention provides a computer program product comprising a computer readable storage medium having program instructions embodied therewith, wherein the program instructions are executable by a processor to cause the processor to perform a method. The method comprises storing an operating system in minor stripes on a first data storage device forming a first logical storage unit, and storing data in major stripes across a plurality of data storage devices forming a second logical data storage unit, wherein each major stripe includes a plurality of minor stripes storing data and a parity stripe. The method further comprises calculating the parity stripe from the plurality of minor stripes within the major stripe and a corresponding one of the minor stripes on the first data storage device, wherein the minor stripes on the first data storage device match the size of the minor stripes on the array of data storage devices.

DETAILED DESCRIPTION

Figure 1:
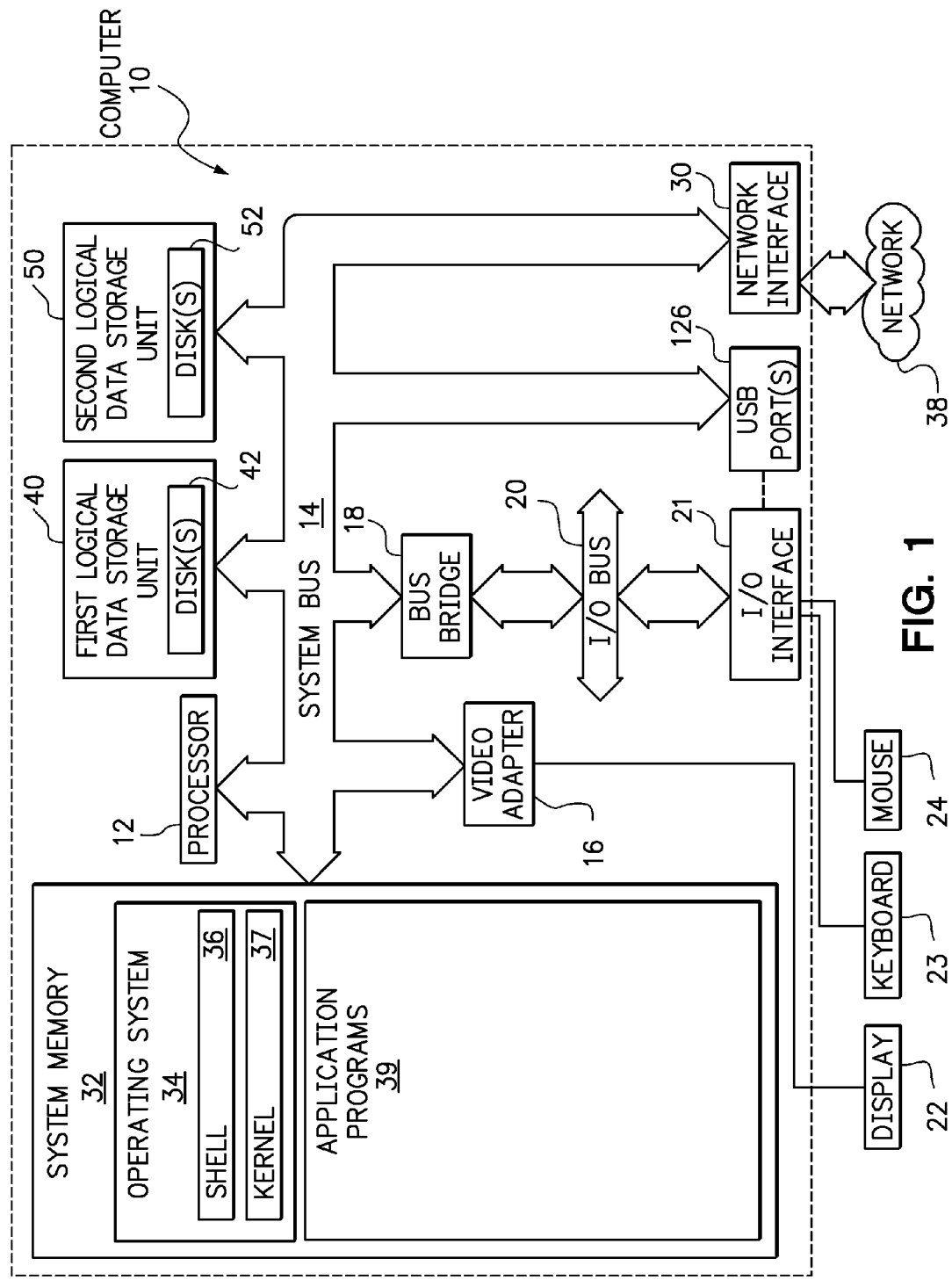
FIG. 1 is a diagram of a computer that may be utilized in accordance with one embodiment of the present invention.

One embodiment of the present invention provides a method comprising storing an operating system in minor stripes on a first data storage device forming a first logical storage unit, and storing data in major stripes across a plurality of data storage devices forming a second logical data storage unit, wherein each major stripe includes a plurality of minor stripes storing data and a parity stripe. The method further comprises calculating the parity stripe from the plurality of minor stripes within the major stripe and a corresponding one of the minor stripes on the first data storage device, wherein the minor stripes on the first data storage device match the size of the minor stripes on the array of data storage devices.

The first data storage device forms a first logical storage unit and stores the operating system in minor stripes. Since the operating system is stored entirely on the first data storage device, the computer is able to boot from the operating system on the first data storage device without access to the plurality of data storage devices. There are preferably no data stripes or parity stripes stored on the first data storage device, and the operating system is optionally the only software stored on the first data storage device. In a preferred embodiment, the first data storage device is a first direct attached storage subsystem of a computer and the plurality of data storage devices is a second direct attached storage subsystem of the computer.

The plurality of data storage devices forms a second logical data storage unit that includes at least three data storage devices. The computer is able to access data on the plurality of data storage devices independent of access to the first data storage device. The data is stored as a major stripe including a plurality of minor stripes storing data and a parity stripe storing parity. The parity stripe is preferably distributed across the plurality of data storage devices of the second logical data storage unit. The plurality of data storage devices may be controlled and used consistent with a RAID 5 (level 5 redundant array of independent disks) configuration, except that the parity is calculated from the plurality of minor stripes within the major stripe and also from a corresponding one of the minor stripes on the first data storage device. This is facilitated where the minor stripes on the first data storage device match the size of the minor stripes on the plurality of data storage devices.

The primary benefit of including the minor stripe of the first data storage device (first logical data storage unit) in the calculation of parity to be stored on the plurality of data storage devices (second logical data storage unit) is the provision of redundancy to the first data storage device without having requiring a separate data storage device to minor the first data storage device. Furthermore, embodiments of the present invention allow a first logical data storage unit for the operating system and a second logical data storage unit for data. In a large datacenter, providing redundancy to the first data storage device without a dedicated data storage device to minor the first data storage device will eliminate a large number of data storage devices.

In one option, the method may include recreating the data stripes and parity stripes stored on an identified one of the plurality of data storage devices using the first data storage device and the data and parity stripes on the other data storage devices in response to failure of the identified data storage device. In other words, the data storage devices that have not failed, including the first data storage device, are used to calculate the minor stripes that were on the failed data storage device. Where the failed data storage device has been replaced, the calculated minor stripes are written to the new data storage device. Once the calculated minor stripes have been written to the new data storage device, redundancy has been restored to both the first data storage device and the plurality of data storage devices.

In another option, the method may include recreating the operating system on a new data storage device using the data and parity minor stripes on the plurality of data storage devices in response to failure of the first data storage device. Once the calculated minor stripes of the operating system have been written to the new data storage device, redundancy has been restored to the first data storage device. Beneficially, failure of the first data storage device does not result in a loss of redundancy in the plurality of data storage devices.

In yet another option, the method may include generating and storing new parity data to be stored in the parity stripes in response to replacing the operating system on the first data storage device. The operating system may be replaced, for example, when the operating system is updated to a new or patched version. As another example, the operating system may be replaced by replacing the first data storage device with a new data storage device that stored the new or patched version of the operating system. Accordingly, the parity stripes that were determined and stored using the old version must be recalculated. One the parity minor stripes have been recalculated and stored, redundancy has been restored to both the first data storage device and the plurality of data storage devices.

Another embodiment of the present invention provides a computer program product comprising a computer readable storage medium having program instructions embodied therewith, wherein the program instructions are executable by a processor to cause the processor to perform a method. The method comprises storing an operating system in minor stripes on a first data storage device forming a first logical storage unit, and storing data in major stripes across a plurality of data storage devices forming a second logical data storage unit, wherein each major stripe includes a plurality of minor stripes storing data and a parity stripe. The method further comprises calculating the parity stripe from the plurality of minor stripes within the major stripe and a corresponding one of the minor stripes on the first data storage device, wherein the minor stripes on the first data storage device match the size of the minor stripes on the array of data storage devices.

The foregoing computer program products may further include computer readable program code for implementing or initiating any one or more aspects of the methods described herein. Accordingly, a separate description of the methods will not be duplicated in the context of a computer program product.

FIG. 1 is a diagram of a computer 10 that may be used in accordance with one embodiment of the present invention. The computer 10 includes a processor unit 12 that is coupled to a system bus 14. Processor unit 12 may utilize one or more processors, each of which has one or more processor cores. A video adapter 16, which drives/supports a display 22, is also coupled to the system bus 14. The system bus 14 is coupled via a bus bridge 18 to an input/output (I/O) bus 20. An I/O interface 21 is coupled to I/O bus 20 and provides communication with various I/O devices, including a keyboard 23 and a mouse 24. The I/O devices may optionally include storage devices, such as CD-ROM drives and multi-media interfaces, other printers, and external USB port(s). While the format of the ports connected to I/O interface 21 may be any known to those skilled in the art of computer architecture, in a preferred embodiment some or all of these ports are universal serial bus (USB) ports. As depicted, the computer 10 is able to communicate over a network 38 using a network interface 30. The network 38 may be an external network, such as the global communication network, and perhaps also an internal network such as an Ethernet LAN or a virtual private network (VPN).

A first logical data storage unit 40 including a hard disk drive 42 and a second logical data storage unit 50 including hard disk drives 52 are also coupled to the system bus 14. In a preferred embodiment, the hard disk drive 42 stores the operating system and populates a system memory 32, which is also coupled to system bus 14. The system memory is the lowest level of volatile memory in the computer 10. The volatile memory may include additional higher levels of volatile memory (not shown), including, but not limited to, cache memory, registers and buffers. Data that populates system memory 32 includes the operating system (OS) 34 and various application programs 39.

The operating system 34 includes a shell 36, for providing transparent user access to resources such as application programs 39. Generally, the shell 36 is a program that provides an interpreter and an interface between the user and the operating system. More specifically, the shell 36 executes commands that are entered into a command line user interface or from a file. Thus, the shell 36, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 37) for processing. Note that while the shell 36 is a text-based, line-oriented user interface, the present invention will equally well support other user interface modes, such as graphical, voice, gestural, etc.

As depicted, the OS 34 also includes a kernel 37, which includes lower levels of functionality for the OS 34, including providing essential services required by other parts of the OS 34 and the application programs 39, including memory management, process and task management, disk management, and mouse and keyboard management.

The hardware elements depicted in the computer 10 are not intended to be exhaustive, but rather are representative components suitable to perform the processes of the present invention. For instance, the computer 10 may include alternate memory storage devices such as magnetic cassettes, digital versatile disks (DVDs), Bernoulli cartridges, and the like. These and other variations are intended to be within the scope of the present invention.

Figure 2:
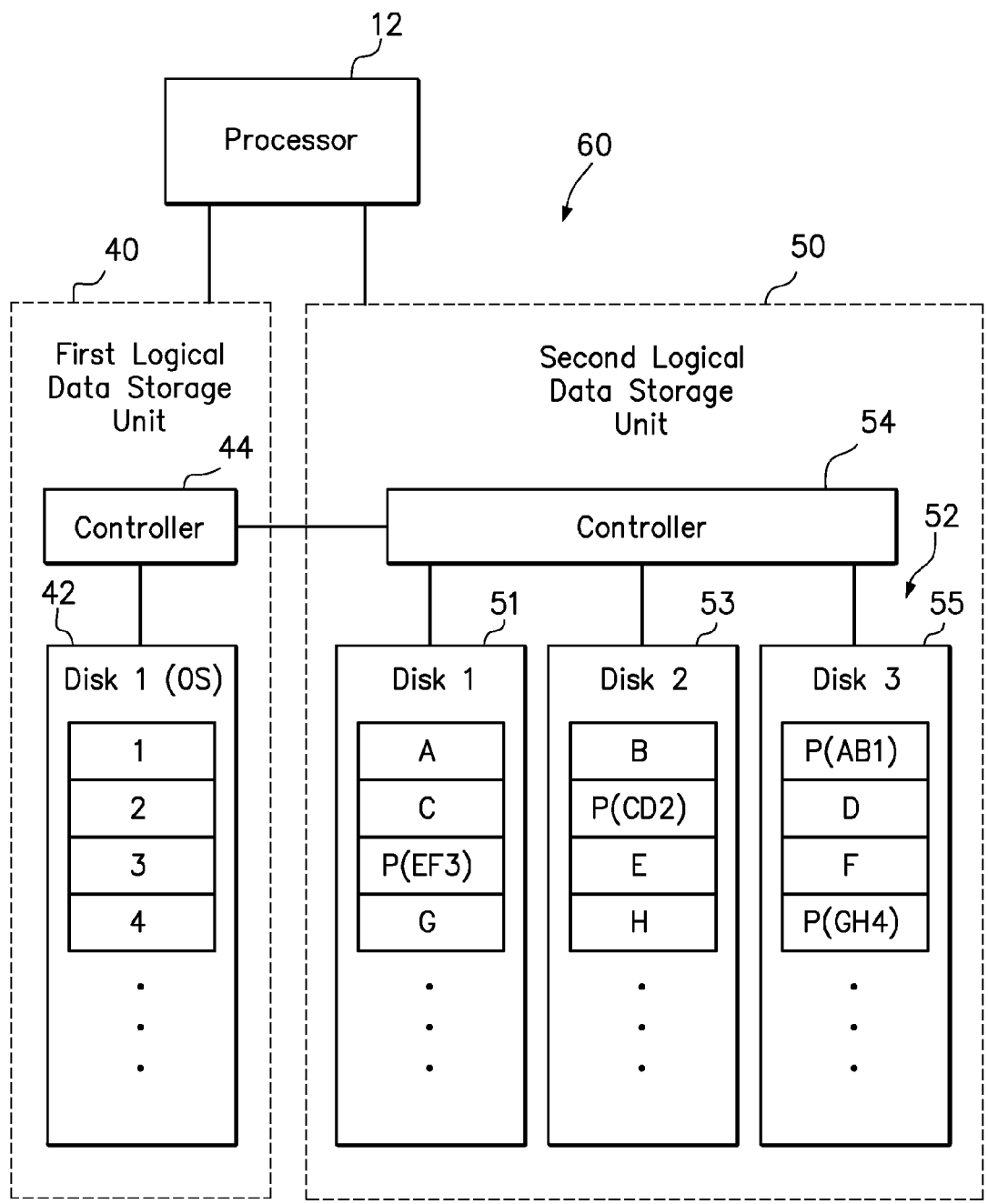
FIG. 2 is a diagram of a configuration of first and second logical data storage units according to one embodiment of the present invention.
Figure 3:
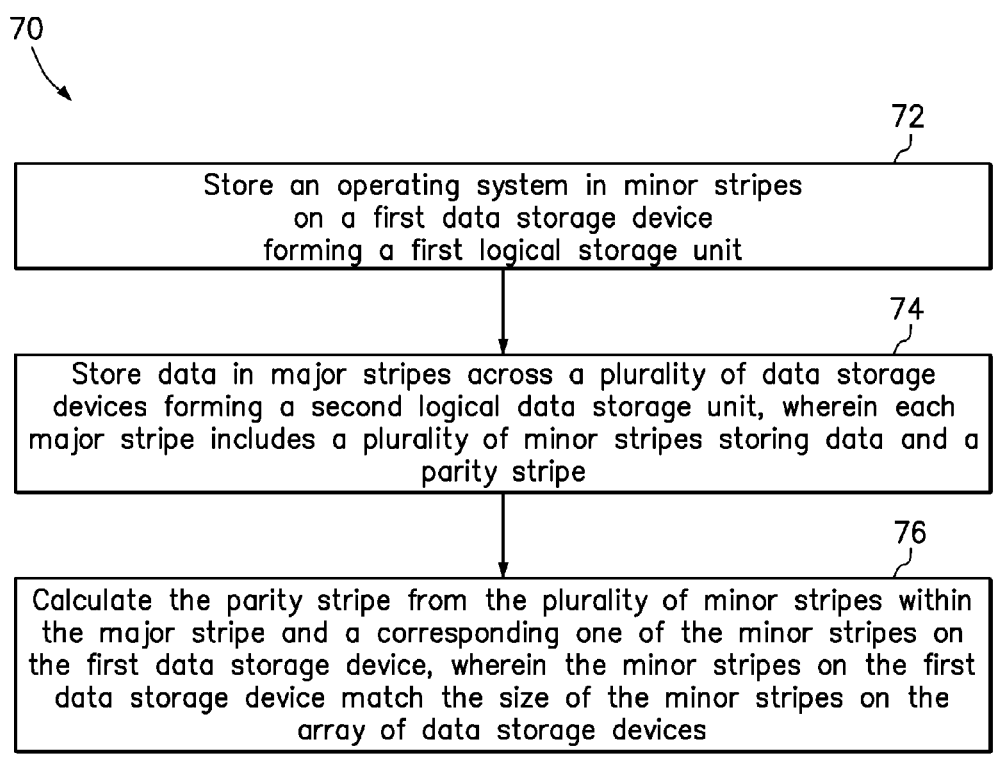
FIG. 3 is a flowchart of a method according to one embodiment of the present invention.

FIG. 2 is a diagram of a data storage system 60, such as a direct attached data storage system. The data storage system 60 includes the first logical data storage unit 40 and the second logical data storage unit 50. Both of the first and second logical data storage units 40, 50 may be independently accessed for read and write operations, such as through instructions from the processor 12 to the respective controllers 44, 54.

The first logical data storage unit 40 includes a controller 44 that handles read and write operations to the hard disk drive 42. As shown, the operating system is stored on the hard disk drive 42 in stripes. While many stripes would be used, the hard disk drive 42 illustrates just four stripes (stripes 1-4) for the purpose of providing an example.

The second logical data storage unit 50 includes a controller 54 that handles read and write operations to a plurality of hard disk drives 52. In this example, the plurality of hard disk drives 52 includes a first disk 51, a second disk 53, and a third disk 55. When the controller 54 receives an instruction to write data to the plurality of hard disk drives 52, the data is written in major stripes across the three disks 51, 53, 55. In FIG. 2, a first major stripe is illustrated as the top row of blocks, and subsequent major strips are illustrated as subsequent rows of blocks, where each block represents a minor stripe. The first major stripe includes a first data minor stripe A on disk 1, a second minor stripe B on disk 2, and a minor stripe P(AB1) on disk 3. The minor stripe P(AB1) includes parity calculated using minor stripe A and minor stripe B from the disks 51, 53 on the second logical data storage unit 50, and the minor strip 1 from the disk 42 of the first logical data storage unit 40. This calculation of parity may be facilitated by allowing the controller 54 of the second logical data storage unit 40 to communicate directly with the controller 44 of the first logical data storage unit 50 to obtain the content of the corresponding minor stripe 1. Therefore, the controller 54 may use standard circuits or logic to determine the parity to be stored in the minor stripe P(AB1) on disk 3. For example, one parity calculation takes the bitwise exclusive-OR (XOR) of each minor stripe that is included (i.e., minor stripes A, B and 1). Alternatively, the parity calculation may implement even parity or odd parity (i.e., each bit in the parity minor stripe is either a 0 or a 1 in order to provide an even or odd number of 1s in the minor stripes including the parity minor stripe. To facilitate the parity calculation, the minor stripes of the disk 42 storing the operating system are preferably the same size as the minor stripes of the disks 51, 53, 55 storing data or applications. As new major stripes are created down the disks, the positioning of the minor parity stripe will move locations in a manner such that the burden of parity writes or reads is more or less evenly distributed across the disks 51, 53, 55 in order to improve performance. Correspondence between a minor stripe of the disk 42 of the first logical data storage unit 40 and a major stripe of the second logical data storage unit 50 may be stored by one of the controllers 44, 54 as a table or a standard rule that associates the addresses of one stripe with another.

In the configuration of FIG. 2, the system provides redundancy to the disk 42 storing the operating system, but doesn't require a separate disk dedicated to mirroring the disk 42. Still, the operating system may be stored entirely on the disk 42 of the first logical data storage unit 40 and the data may be stored entirely on the disks 51, 53, 55 of the second logical data storage unit 50. The disk 42 containing the operating system does not store any parity data, such that the second logical data storage unit is a stand-alone entity and can be removed from the computer (such as a server) without damaging the ability of the computer to boot. The operating system disk can be removed from the system without compromising the ability to provide the user with data.

The configuration of FIG. 2 may be described as a hybrid asymmetric mix of a RAID 1 mirror 40 and a parity based RAID array 50, such as a RAID 5 array. The configuration is asymmetric because the parity based RAID array utilizes data from the OS RAID mirror for its parity calculations. In the event that the OS drive 40 were to fail, the system can recreate any data on the disk by utilizing the content in the parity based array 50. The OS drive contains no data from the parity based data array, so the OS drive can be separated from the server or even replaced with a new image at any time and be completely bootable.

If the OS drive 40 is replaced with a new image, both the OS drive 40 and the RAID array 50 will be in critical mode until the parity based RAID array has been rebuilt using the data from the new OS disk to generate new parity. If the data array 50 is removed from the system, the OS drive can operate as a stand-alone unit with no need for the data array to ever be replaced unless the user requires redundancy at a later time. If a user decides to combine an existing OS drive into this type of configuration with a parity based RAID array, the two can be combined with a configuration tool so they are logically bonded together, followed by a rebuild of the parity on the data array.

FIG. 4 is a flowchart of a method 70 according to one embodiment of the present invention. Step 72 stores an operating system in minor stripes on a first data storage device forming a first logical storage unit. Step 74 stores data in major stripes across a plurality of data storage devices forming a second logical data storage unit, wherein each major stripe includes a plurality of minor stripes storing data and a parity stripe. In step 76, the parity stripe is calculated from the plurality of minor stripes within the major stripe and a corresponding one of the minor stripes on the first data storage device, wherein the minor stripes on the first data storage device match the size of the minor stripes on the array of data storage devices.

The present invention may be a system, a method, and/or a computer program product. The computer program product may include a computer readable storage medium (or media)

having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally,"

"may," and similar terms are used to indicate that an item, condition or step being referred to is an optional (not required) feature of the invention.

The corresponding structures, materials, acts, and equivalents of all means or steps plus function elements in the claims below are intended to include any structure, material, or act for performing the function in combination with other claimed elements as specifically claimed. The description of the present invention has been presented for purposes of illustration and description, but it is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer program product comprising a computer readable storage medium having program instructions embodied therewith, the program instructions executable by a processor to cause the processor to perform a method comprising:
    storing an operating system in minor stripes on a first data storage device forming a first logical storage unit;
    storing data in major stripes across a plurality of data storage devices forming a second logical data storage unit, wherein each major stripe includes a plurality of minor stripes storing data and a parity stripe; and
    calculating the parity stripe from the plurality of minor stripes within the major stripe and a corresponding one of the minor stripes on the first data storage device, wherein the minor stripes on the first data storage device match the size of the minor stripes on the array of data storage devices.

2. The computer program product of claim 1, wherein the parity stripe is distributed across the plurality of data storage devices.

3. The computer program product of claim 1, wherein there is no data stored on the first data storage device.

4. The computer program product of claim 1, wherein the operating system is the only software stored on the first data storage device.

5. The computer program product of claim 1, wherein the first data storage device is a first direct attached storage subsystem of a computer and the array of data storage devices is a second direct attached storage subsystem of the computer.

6. The computer program product of claim 1, wherein the plurality of data storage devices includes at least three data storage devices.

7. The computer program product of claim 1, wherein the first data storage device does not contain any parity data for the plurality of data storage device.

8. The computer program product of claim 1, wherein the computer is able to boot from the operating system on the first data storage device without access to the plurality of data storage devices.

9. The computer program product of claim 1, wherein the plurality of data storage devices are able to provide access to the data without access to the first data storage device.

10. The computer program product of claim 1, the method further comprising:
    recreating the data stripes and parity stripes stored on an identified one of the plurality of data storage devices using the first data storage device and the data and parity stripes on the other data storage devices in response to failure of the identified data storage device.

11. The computer program product of claim 1, the method further comprising:
    recreating the operating system on a new data storage device using the data and parity stripes on the plurality of data storage devices in response to failure of the first data storage device.

12. The computer program product of claim 1, the method further comprising:
    generating and storing new parity data to be stored in the parity stripes in response to replacing the operating system on the first data storage device.

13. The computer program product of claim 1, the method further comprising:
    generating and storing new parity data to be stored in the parity stripes in response to replacing the first data storage device.

* * * * *